United States Patent
Kerfoot

(10) Patent No.: US 7,213,642 B2
(45) Date of Patent: May 8, 2007

(54) MULTI-FLUID SPARGING

(76) Inventor: William B. Kerfoot, 49 Ransom Rd., Falmouth, MA (US) 02540

(*) Notice: Subject to any disclaimer, the term of this patent is extended or adjusted under 35 U.S.C. 154(b) by 427 days.

(21) Appl. No.: 10/794,994

(22) Filed: Mar. 5, 2004

(65) Prior Publication Data

US 2005/0194148 A1    Sep. 8, 2005

(51) Int. Cl.
*E21B 43/34* (2006.01)
(52) U.S. Cl. .................. 166/105.5; 166/236; 210/760; 210/215; 405/128.5
(58) Field of Classification Search ......... 166/369, 166/105.5, 162, 236, 265, 310, 312; 210/759, 210/760, 763, 198.1, 205, 215, 221.2, 264, 210/283, 288; 405/52, 128.15, 128.5, 128.75, 405/129.25
See application file for complete search history.

(56) References Cited

U.S. PATENT DOCUMENTS

| | | | | |
|---|---|---|---|---|
| 4,118,447 A * | 10/1978 | Richter | ............ | 261/122.1 |
| 5,620,593 A * | 4/1997 | Stagner | ............ | 210/90 |
| 5,622,450 A * | 4/1997 | Grant, Jr. | ............ | 405/128.2 |
| 5,879,108 A * | 3/1999 | Haddad | ............ | 405/128.45 |
| 5,967,230 A * | 10/1999 | Cooper et al. | ............ | 166/245 |
| 6,312,605 B1 * | 11/2001 | Kerfoot | ............ | 210/741 |
| 6,436,285 B1 * | 8/2002 | Kerfoot | ............ | 210/199 |
| 6,447,676 B1 * | 9/2002 | Kerfoot | ............ | 210/170 |
| 6,533,499 B2 * | 3/2003 | Breeding | ............ | 405/128.75 |
| 6,596,177 B2 * | 7/2003 | Sherman | ............ | 210/758 |
| 6,745,815 B1 * | 6/2004 | Senyard et al. | ............ | 160/370 |
| 6,818,136 B1 * | 11/2004 | Marek | ............ | 210/747 |
| 6,921,477 B2 * | 7/2005 | Wilhelm | ............ | 210/170 |

* cited by examiner

*Primary Examiner*—David Bagnell
*Assistant Examiner*—Daniel P. Stephenson
(74) *Attorney, Agent, or Firm*—Fish & Richardson P.C.

(57) ABSTRACT

A diffuser useful for sparging to remove contaminant in situ is described. The diffuser includes a first elongated member having a sidewall with a first portion of the length of the sidewall being microporous, and a second portion of the length of the sidewall having well screen sized openings with the first elongated member defining an interior hollow portion of the diffuser, a second elongated member having a second sidewall having a plurality of microscopic openings, said second member being disposed through the hollow region of said first member and a third elongated member having a third sidewall having a plurality of microscopic openings, said third member being disposed coaxial with the first and second members. An end cap is disposed to seal a first end of the third elongated member, and being in contact with the second elongated member forms a chamber. The diffuser has an inlet arrangement disposed at a second end of diffuser for supporting a first inlet fitting to coupled to an peripheral interior portion of the diffuser adjacent the first member, a second fitting to couple to the chamber, and a third fitting coupled to the third member.

31 Claims, 4 Drawing Sheets

MULTI-FLUID SPARGING

BACKGROUND

There is a well-recognized need to clean-up contaminants that exist in ground water, i.e., aquifers and surrounding soil formations. Such aquifers and surrounding soil formations may be contaminated with various constituents including organic compounds such as, volatile hydrocarbons, including chlorinated hydrocarbons such as trichloroethene (TCE), tetrachloroethene (PCE). Other contaminates that can be present include vinyl chloride, 1,1 trichloroethane (TCA), and very soluble gasoline additives such as methyltertiarybutylether (MTBE). Other contaminants may also be encountered.

SUMMARY

According to an aspect of this invention, a diffuser includes a first elongated member having a sidewall with a first portion along the length of the sidewall having microporous openings, and a second portion along the length of the sidewall having well screen sized openings, the first elongated member defining an interior portion of the diffuser. The diffuser includes a second elongated member having a second sidewall having a plurality of microscopic openings, the second member being disposed through the interior region of the first member. The diffuser includes a third elongated member having a third sidewall having a plurality of microscopic openings, the third member being disposed coaxial with the first and second members. The diffuser also has an end cap to seal a first end of the third elongated member, and being in contact with the second elongated member to form a chamber and an inlet arrangement disposed at a second end of diffuser for supporting a first inlet fitting that provides an peripheral interior portion of the diffuser adjacent the first member, a second fitting to couple to the chamber, and a third fitting coupled to the third member.

The diffuser has a chamber defined between the first and second elongated members filled with a microporous material. The diffuser has the first, second and third elongated members configured as cylinders, with the third cylinder disposed concentric to the second cylinder, and the second cylinder disposed concentric to the first cylinder. The diffuser has the inlet cap including a first fitting disposed at a peripheral portion thereof that permits a fluid to be injected into a inner peripheral portion of the diffuser, a second fitting disposed to permit a liquid to be injected through the chamber and a third fitting disposed to permit a gas to be injected through the region defined by the third member. Fluid injected through the first fitting is injected under conditions to cause a sheering action on bubbles that exit from sidewalls of the second member, to be carried away through the well-screen sized openings in the second sidewall portion. The diffuser can have a catalyst disposed in glass beads in the chamber with the catalyst containing iron. The second and third members have microscopic openings having a diameter in a range of 0.1 to 200 microns.

According to a further aspect of this invention, a method includes delivering a first fluid to a first port of a diffuser and delivering a gas stream to the diffuser and a liquid to a second port of the diffuser to effect production of microbubbles coated with the liquid, the coated microbubbles diffusing towards peripheral portions of the diffuser and being carried away from those peripheral portions by the first fluid stream.

According to a further aspect of this invention, apparatus includes a first pump to deliver a first stream of gas, a second pump to deliver a second stream of gas, and a multi-fluid diffuser disposed in the well, the multi-fluid microporous diffuser. The first, second and third inlet ports to allow entry of first second and third fluids to the multi-fluid diffuser. The multi-fluid diffuser includes a first elongated member having a sidewall with a first portion of the length of the sidewall being microporous, and a second portion of the length of the sidewall having well screen sized openings with the first elongated member defining an interior hollow portion of the diffuser, a second elongated member having a second sidewall having a plurality of microscopic openings, said second member being disposed through the hollow region of said first member; a third elongated member having a third sidewall having a plurality of microscopic openings, said third member being disposed coaxial with the first and second members and an end cap to seal a first end of the microporous diffuser.

One or more advantages can be provided from the above.

A first fluid is introduced through the inlet attached to the third member as a gas mixture such as ozone/air. The second fluid is a liquid such as hydrogen peroxide, which coats bubbles that are produced from the gas delivered to the first inlet. The third fluid is a liquid such as water, which is injected and acts as a shearing flow to shear coated microbubbles off of the sidewall of the second member. By adjusting the velocity of the shearing fluid, microbubbles of very small size can be produced (e.g., sub-micron sized bubble diameters). Adjusting the conditions and porosity characteristics of the materials can produce larger size bubbles.

The outer cylindrical member can be terminated by a point member to enable the multi-fluid diffuser to be driven into the ground, with or without a well. The space between the second and third members of multi-fluid diffuser is filled with microporous materials that can be any porous materials such as microbeads with mesh sizes from 20 to 200 mesh, or sand pack, or porous hydrophilic plastic.

Further, the chemical oxidation potential can be adjusted to match the type and mass of the organic compounds being oxidized by varying the nature and proportion of the oxidant added.

In operation, the multi-fluid diffuser is disposed in a wet soil or an aquifer with or without a well. The multi-fluid diffuser receives three fluid streams. In one embodiment, the first stream that is fed to the inlet is a liquid such as water, whereas second and third streams are hydrogen peroxide and a gas stream of air/ozone. The multi-fluid diffuser can have water in its interior, occasioned by its introduction into the aquifer.

The air ozone gas stream enters the multi-fluid diffuser and diffuses through the cylindrical member as trapped microbubbles into the space occupied by the microporous materials where a liquid, e.g., hydrogen peroxide is introduced to coat the microbubbles. The liquid stream through the microporous materials is under a siphon condition occasioned by the introduction of water through the periphery of the multi-fluid diffuser. The flow of water in additional to producing a siphoning effect on the liquid also has a shearing effect to shear bubbles from the microporous sides of the cylindrical member, preventing coalescing and bunching of the bubbles around micro-pores of the cylindrical member.

The shearing water flow carries the microbubbles away through the well screen disposed at the bottom of the multi-fluid diffuser, through either continuous or pulsing action.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
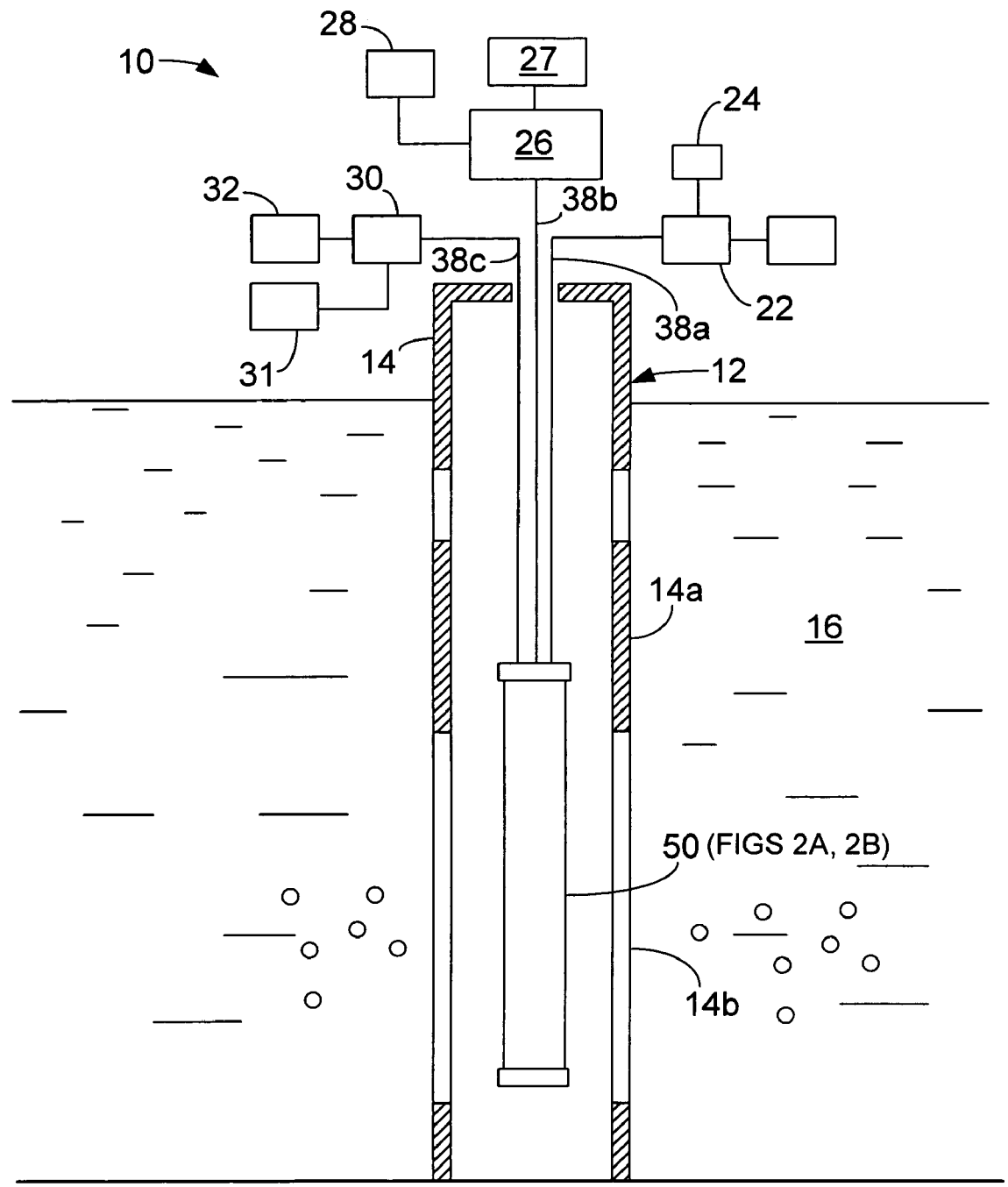
FIG. 1 is a cross-sectional view showing a sparging treatment system.

Referring now to FIG. 1, a sparging arrangement 10 for use with plumes, sources, deposits or occurrences of contaminants, is shown. The arrangement 10 is disposed in a well 12 that has a casing 14 with an inlet screen 14a and outlet screen 14b to promote a re-circulation of water into the casing 14 and through the surrounding ground/aquifer region 16. The casing 14 supports the ground about the well 12. Disposed through the casing 14 are one or more multi-fluid diffusers, e.g., 50, 50' (discussed in FIGS. 3 and 4).

The arrangement 10 also includes a first pump or compressor 22 and a pump or compressor control 24 to feed a first fluid, e.g., a gas such as an ozone/air or oxygen enriched air mixture, as shown, or alternatively, a liquid, such as, hydrogen peroxide or a hydro-peroxide, via feed line 38a to the multi-fluid diffuser 50. The arrangement 10 includes a second pump or compressor 26 and control 27 coupled to a source 28 of a second fluid to feed the second fluid via feed line 38b to the multi-fluid diffuser 50. A pump 30, a pump control 31, and a source 32 of a third fluid is coupled via a third feed 38c to the multi-fluid diffuser 50.

The arrangement 10 can supply nutrients such as catalyst agents including iron containing compounds such as iron silicates or palladium containing compounds such as palladized carbon. In addition, other materials such as platinum may also be used.

Figure 3:
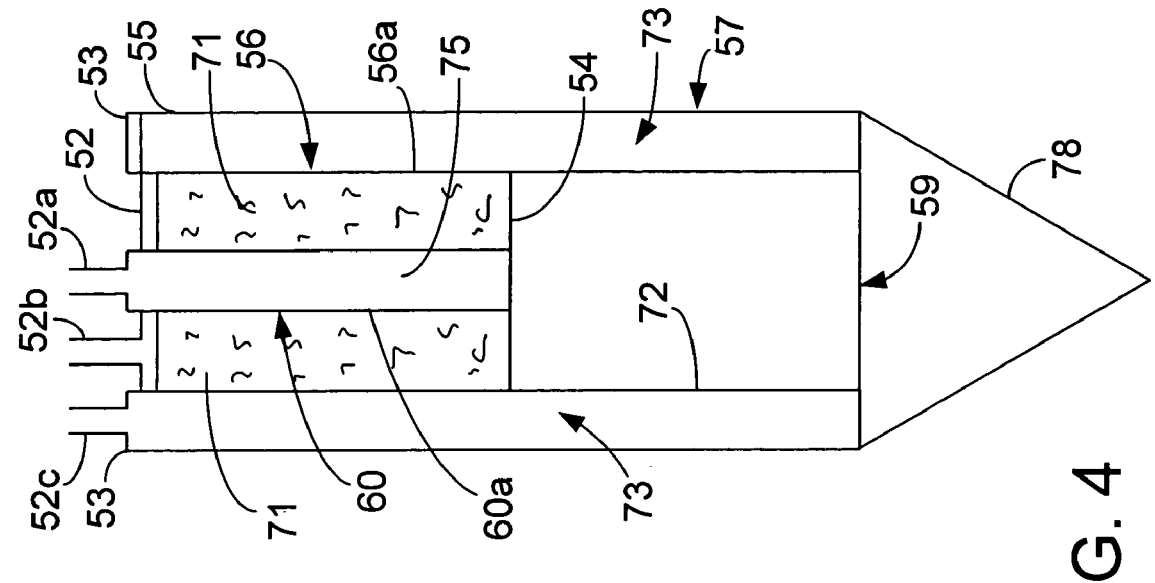
FIG. 3 is a longitudinal cross-section view of a multi-fluid diffuser useful in the arrangement of FIG. 1.
Figure 4:
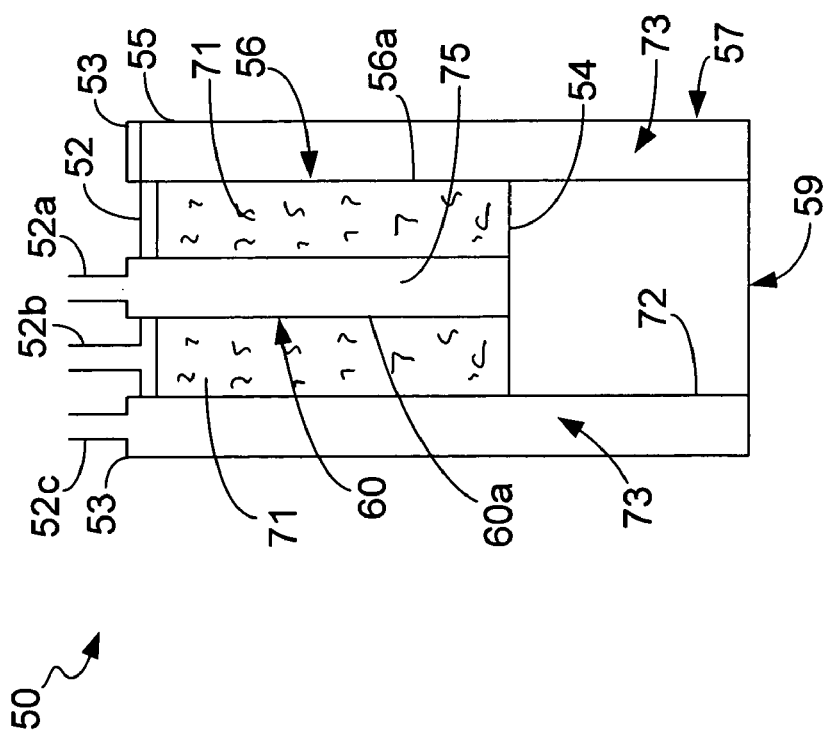
FIG. 4 is a longitudinal cross-section view of an alternative multi-fluid diffuser useful in direct injection into shallow contaminant formations.

The arrangement 10 makes use of a laminar multi-fluid diffuser 50 (FIG. 3 or FIG. 4). The laminar multi-fluid diffuser 50 allows introduction of multiple, fluid streams, with any combination of fluids as liquids or gases. The laminar multi-fluid diffuser 50 has three inlets. One of the inlets introduces a first gas stream within interior regions of the multi-fluid diffuser, a second inlet introduces a fluid through porous materials in the laminar multi-fluid diffuser 50, and a third inlet introduces a third fluid about the periphery of the laminar multi-fluid diffuser 50. The fluid streams can be the same materials or different.

In the embodiment described, the first fluid stream is a gas such as an ozone/air mixture, the second is a liquid such as hydrogen peroxide, and the third is liquid such as water. The outward flow of fluid, e.g., air/ozone from the first inlet 52a results in the liquid, e.g., the hydrogen peroxide in the second flow to occur under a siphon condition developed by the flow of the air/ozone from the first inlet 52a.

Alternatively, the flows of fluid can be reversed such that, e.g., air/ozone from the second inlet 52a and the liquid, e.g., the hydrogen peroxide flow from first inlet, to have the ozone stream operate under a siphon condition, which can be used to advantage when the arrangement is used to treat deep deposits of contaminants. The ozone generator operating under a siphon condition is advantageous since it allows the ozone generator to operate at optimal efficiency and delivery of optimal amounts of ozone into the well, especially if the ozone generator is a corona discharge type. In this embodiment, the third fluid flow is water. The water is introduced along the periphery of the multi-fluid diffuser 50 via the third inlet.

Figure 2:
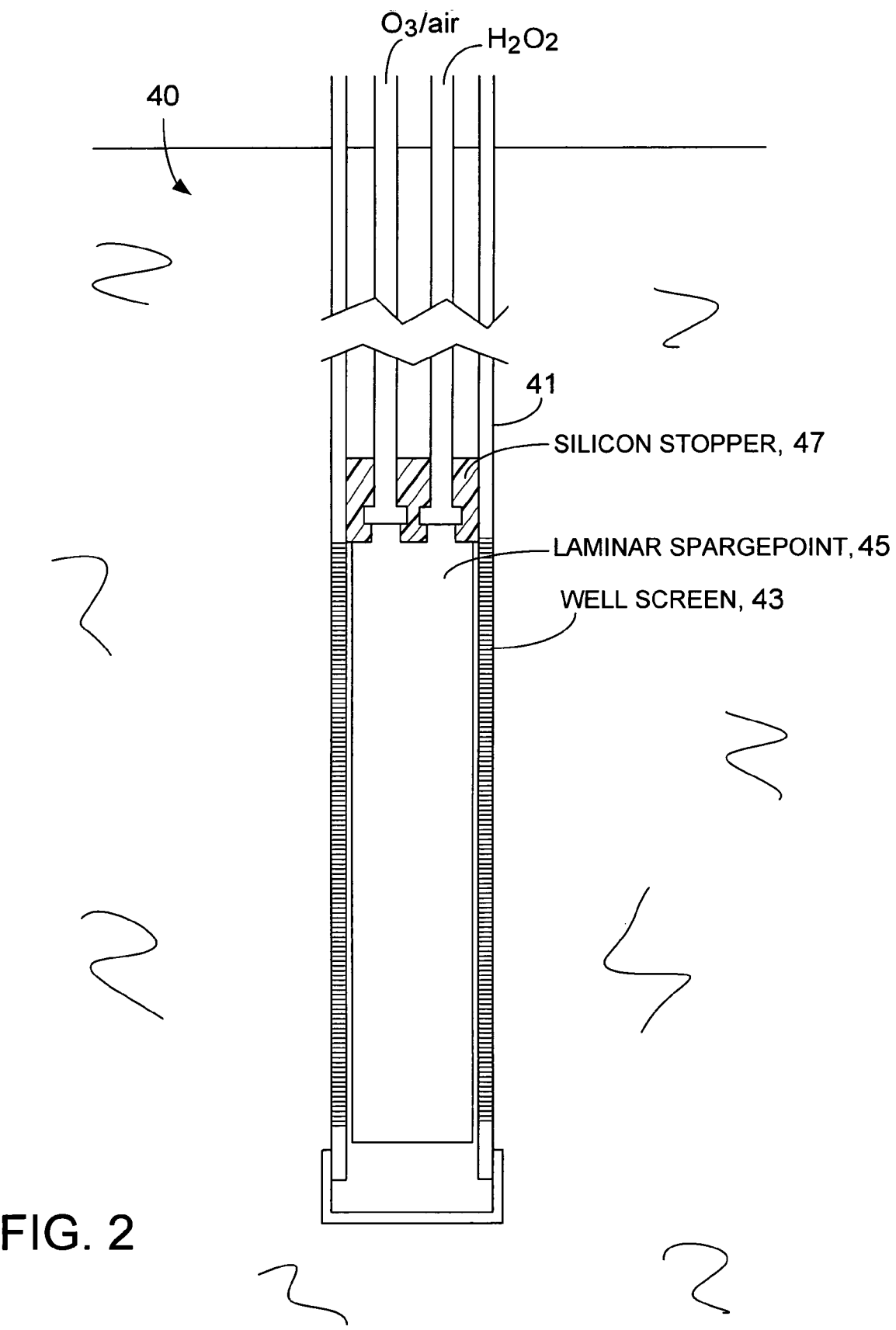
FIG. 2 is a cross-sectional view showing a sparging treatment system with well screen and a multi-fluid diffuser.

Referring to FIG. 2, an alternate arrangement 40 to produce the fine bubbles is shown. A well casing 41 is injected or disposed into the ground, e.g., below the water table. The casing 41 carries, e.g., a standard 10-slot well-screen 43. A laminar microporous diffuser 45 is disposed into the casing 41 slightly spaced from the well screen 43. A very small space is provided between the laminar microporous diffuser 45 and the 10-slot well screen. In one example, the laminar microporous diffuser 45 has an outer diameter of 2.0 inches and the inner diameter of the well casing is 2.0 inches. The laminar microporous diffuser 45 is constructed of flexible materials (described below) and as the laminar microporous diffuser 45 is inserted into the casing 41 it flexes or deforms slightly so as to fit snugly against the casing 41. In general for a 2 inch diameter arrangement a tolerance of about +/−0.05 inches is acceptable. Other arrangements are possible. The bottom of the casing 41 is terminated in an end cap. A silicon stopper 47 is disposed over the LAMINAR SPARGEPOINT® type of microporous diffuser available from KV-Associates, Inc. and also described in U.S. Pat. No. 6,436,285. The silicone stopper 47 has apertures to receive feed lines from the pumps (as in FIG. 1, but not shown in FIG. 2).

Exemplary operating conditions are set forth in TABLE 1.

TABLE 1

| Unit | Air | Ozone gm/day | Hydro-peroxide gal/day | Water Flow gal/min | Recirculation Wells | Laminar microporous diffuser with screen | Operating pressure (psi) |
|---|---|---|---|---|---|---|---|
| Wall mount | 3–5 cfm | 144–430 | 5–50 | 1–3 | 1–4 | 1–8 | 0–30 |
| Palletized | 10–20 cfm | 300–1000 | 20–200 | 1–10 | 1–8 | 1–16 | 0–100 |
| Trailer | 20–100 cfm | 900–5000 | 60–1000 | 1–50 | 1–20 | 1–40 | 0–150 |

Flow rates are adjusted to a pressure that offsets groundwater hydraulic head and formation backpressures. In general, pressures of, e.g., above 40 psi ambient are avoided so as to prevent fracture or distortion of microscopic flow channels. The percent concentration of hydroperoxide in water is typically in a range of 2–20 percent, although other concentrations can be used. The flow is adjusted according to an estimate of the total mass of the contaminants in the soil and water. If high concentrations (e.g., greater than 50,000 parts per billion in water or 500 mg/kg in soil) of the contaminants are present, sufficient hydroperoxides are added to insure efficient decomposition by a Criegee or a pseudo Creigee or hydroxyl-radical reaction mechanism.

Fine bubbles from an inner surface of the microporous gas flow and water (including a hydroperoxide, e.g., hydrogen peroxide) are directed by lateral laminar flow through the porous material or closed spaced plates (FIG. 2). The gas to water flow rate is held at a low ratio, e.g., sufficiently low so that the effects of coalescence are negligible and the properties of the fluid remain that of the entering water.

Alternatively, the water flow is oscillated (e.g., pulsed), instead of flowing freely, both to reduce the volume of water required to shear, and maintain the appropriate shear force at the interactive surface of the gas-carrying microporous material. John San et al., Separation Science and Technology, 17(8), pp. 1027–1039, (1982), described that under non-oscillating conditions, separation of a bubble at a microporous frit surface occurs when a bubble radius is reached such that drag forces on the bubble equal the surface tension force ($\pi D \gamma$), as:

$$C_D \cdot \frac{P U_0^2 A_P}{2} = \Pi D Y$$

Where P is the fluid density, $U_0^2$ is the fluid velocity, $A_p$ is the projected bubble area, $\gamma$ is the gas-water surface tension, and D is the pore diameter of the frit. A bubble is swept from the microporous surface when the bubble radius is reached such that the dynamic separating force due to drag equals the retention force due to surface tension. Bubble distributions of 16 to 30 μm (micron) radius and 1 to $4 \times 10^6$ bubbles/min can be produced with a gas flow rate of 8 cm$^3$/min and water flow rates of 776 cm$^3$/min across a microporous surface of μm (micron) pore size with a 3.2 cm diameter surface area. If the flow of liquid is directed between two microporous layers in a fluid-carrying layer, not only is a similar distribution of microbubble size and number of microbubbles produced, but, the emerging bubbles are coated with the liquid which sheared them off.

Instead of using a continual flow of fluid to shear the surface, the liquid can be oscillated (pulsed) at a frequency sufficient to allow for fluid replacement in the microporous diffuser, for the volume of liquid removed as coatings on the bubbles, but not allowing interruption of the liquid/bubble column on its way to the surface (or through a slit, e.g., well screen slot). To avoid coalescing of the microbubbles, a continual stream of microbubbles, coated with the peroxide liquid is emitted from the surface of the laminated material.

Some examples of gas flows and liquid volumes are listed below for each of the examples described in FIGS. 1 and 2.

TABLE II

| Per 8 cm surface area, (5 μm (micron) porosity) | | | |
|---|---|---|---|
| Water Flow rates 10 cm$^3$/min gas | Mean Bubble size (μm) | Bubble size range (μm) | Rotative Frequency bubbles/min |
| 250 cm$^3$/min | 30 | 16–60 | $4 \times 10^6$ |
| 500 cm$^3$/min | 20 | 16–50 | $7 \times 10^6$ |
| 800 cm$^3$/min | 15 | 8–30 | $15 \times 10^6$ |
| 1500 cm$^3$/min | 10 | 5–15 | $30 \times 10^6$ |
| 3000 cm$^3$/min | 5 | .5–10 | $50 \times 10^6$ |

For an equivalent LAMINAR SPARGEPOINT® type of microporous diffuser available from Kerfoot Technologies, Inc. (formally KV-Associates (2 INCH OUTER DIAMETER)

For Laminar Spargepoint®

Porous Surface Area is 119 sq. in. (771 sq. cm.)

Gas flow 25000 cm$^3$/min (25 l/min) or (0.8825 cu. ft/min) =52.9 cu. ft./hr.

(20 cfm)=1200 cu. ft./hr (L×0.264=gallons)

Liquid flow

If continuous: 625 l/min (165 gallons/min) or 2000 gallons/day

If oscillate: 5 gallons/day

The liquid is supplied with a Pulsafeeder® pulsing peristaltic pump to oscillate the liquid (5 psi pulse/sec) and to deliver an adjustable 0.1 to 10 liters/hour (7 to 60 gallons/day).

| TWO LAMINAR MICROPOROUS MATERIALS OSCILLATING GAS | | | |
|---|---|---|---|
| GAS FLOW 50 scf | WATER FLOW 200–800 ccm/min | BUBBLE SIZE (μm) | FREQUENCY Bubbles/min. |
| 1 cfm | 1 L/min (.26 gallons/min | 20 μm | $10 \times 10^8$ |
| 3 cfm | 3 L/min (.78 gallons/min | 20 μm | $10 \times 10^8$ |
| 30 cfm* | 30 L/min (7.8 gallons/min | 20 μm | $10 \times 10^8$ |

(2 inch 800 sq. cm. LAMINAR SPARGEPOINT ® type of microporous diffuser available from Kerfoot Technologies, Inc.[1]
[1]Would require ten (10) LAMINAR SPARGEPOINT ® type of microporous diffuser for operation, or increase length or diameter of the microporous diffuser).

For insertion of the LAMINAR SPARGEPOINT® type of microporous diffuser into well screens or at depth below water table, the flow of gas and liquid is adjusted to the back pressure of the formation and, for gas reactions, the height (weight) of the water column. At ambient conditions (corrected for height of water column), the liquid fraction is often siphoned into the exiting gas stream and requires no pressure to introduce it into the out flowing stream. The main role of an oscillating liquid pump is to deliver a corresponding flow of liquid to match a desired molar ratio of ozone to hydrogen peroxide for hydroxyl radical formation as:

$2O_3 + H_2O_2 \rightarrow 2OH + 3O_2$

Set out below are different operating conditions for different types of systems available from Kerfoot Technologies, Inc. (formally KV-Associates, Inc.) Mashpee Mass.

Other systems with corresponding properties could be used.

Wallmount Unit
Pressure range, injection: 10 to 40 psi
Gas flow: 1-Scfm (50 to 350 ppmv ozone)
Liquid range: 0.03–0.5 gallons/hr. (55 gallon tank) (3 to 8% peroxide).
Shearing fluid (water)
Palletized Units
Pressure range-injection: 10 to 100 psi
Gas flow: 0–20 cfm (50 to 2000 ppmv ozone)
Liquid range: 0–5 gallons/hr (3 to 9% peroxide)
Shearing fluid (water)
Trailer Units
Pressure range-injection: 10 to 150 psi
Gas flow: 0–100 cfm (50 to 10,000 ppmv ozone)
Liquid range: 0–20 gallons/hr (3 to 9% peroxide)
Shearing fluid (water)

The process involves generation of extremely fine microbubbles (sub-micron in diameter up to less than about 200 microns in diameter) that promote rapid gas/gas/water reactions with volatile organic compounds. The production of microbubbles and selection of appropriate size distribution optimizes gaseous exchange through high surface area to volume ratio and long residence time within the material to be treated. The equipment promotes the continuous or intermittent production of microbubbles while minimizing coalescing or adhesion.

The injected air/ozone combination moves as a fluid of such fine bubbles into the material to be treated. The use of microencapsulated ozone enhances and promotes in-situ stripping of volatile organics and simultaneously terminates the normal reversible Henry s reaction. The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, CO2 and H2O accomplishes this. In the case of petroleum products like BTEX (benzene, toluene, ethylbenzene, and xylenes), the benzene entering the bubbles reacts to decompose to CO2 and H2O.

Also, pseudo Criegee reactions with the substrate and ozone appear effective in reducing saturated olefins like trichloro ethane (1,1,1-TCA), carbon tetrachloride ($CCl_4$), chloroform and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform, O-xylene, P-xylene, naphthalene and methyltetrabutylether (MTBE).

Ozone is an effective oxidant used for the breakdown of organic compounds in water treatment. The major problem in effectiveness is that ozone has a short lifetime. If ozone is mixed with sewage containing water above ground, the half-life is normally minutes. To offset the short life span, the ozone is injected with multi-fluid diffusers 50, enhancing the selectiveness of action of the ozone. By encapsulating the ozone in fine bubbles, the bubbles would preferentially extract volatile compounds like PCE from the mixtures of soluble organic compounds they encountered. With this process, volatile organics are selectively pulled into the fine air bubbles. The gas that enters a small bubble of volume ($4\pi r3$) increases until reaching an asymptotic value of saturation.

The following characteristics of the contaminants appear desirable for reaction:

Henry's Constant: $10^{-1}$ to $10^{-4}$ m3 atm/mol
Solubility: 10 to 20,000 mg/l
Vapor pressure: 1 to 3000 mmHg
Saturation concentration: 5 to 9000 g/m$^3$ The production of microbubbles and of appropriate size distribution are selected for optimized gas exchange through high surface area to volume ratio and long residence time within the area to be treated.

Referring now to FIG. 3, a multi-fluid diffuser 50 is shown. The multi-fluid diffuser 50 includes inlets 52a–52c, coupled to portions of the multi-fluid diffuser 50. An outer member 55 surrounds a first inner cylindrical member 56. Outer member 55 provides an outer cylindrical shell for the multi-fluid diffuser 50. First inner cylindrical member 56 is comprised of a hydrophobic, microporous material. The microporous material can has a porosity characteristic less than 200 microns in diameter, and preferable in a range of 0.1 to 50 microns, most preferable in a range of 0.1 to 0.5 microns to produce nanometer or sub-micron sized bubbles. The first inner member 56 surrounds a second inner member 60. The first inner member 56 can be cylindrical and can be comprised of a cylindrical member filled with microporous materials. The first inner member 56 would have a sidewall 56a comprised of a large plurality of micropores, e.g., less than 200 microns in diameter, and preferable in a range of 0.1 to 50 microns, most preferable in a range of 0.1 to 0.5 microns to produce nanometer or sub-micron sized bubbles.

A second inner member 60 also cylindrical in configuration is coaxially disposed within the first inner member 56. The second inner member 60 is comprised of a hydrophobic material and has a sidewall 60a comprised of a large plurality of micropores, e.g., less than 200 microns in diameter, and preferable in a range of 0.1 to 50 microns, most preferable in a range of 0.1 to 0.5 microns to produce nanometer or sub-micron sized bubbles. In one embodiment, the inlet 52a is supported on an upper portion of the second inner member 60, and inlets 52b and 52c are supported on a top cap 52 and on a cap 53 on outer member 55. A bottom cap 59 seals lower portion of outer member 55.

Thus, proximate ends of the cylindrical members 56 and 60 are coupled to the inlet ports 52b and 52a respectively. At the opposite end of the multi-fluid diffuser 50 an end cap 54 covers distal ends of cylindrical members 56 and 60. The end cap 54 and the cap 52 seal the ends of the multi-fluid diffuser 50. Each of the members 55, 56 and 60 are cylindrical in shape.

Member 55 has solid walls generally along the length that it shares with cylindrical member 60, and has well screen 57 (having holes with diameters much greater than 200 microns) attached to a lower portion of the outer member 55. Outer member 55 has an end cap 59 disposed over the end portion of the well-screen 57. The multi-fluid diffuser 50 also has a member 72 coupled between caps 54 and 57 that provide a passageway 73 along the periphery of the multi-fluid diffuser 50. Bubbles emerge from microscopic openings in sidewalls 60a and 56a, and egress from the multi-fluid diffuser 50 through the well screen 57 via the passageway 73.

Thus, a first fluid is introduced through first inlet 52a inside the interior 75 of third member 60, a second fluid is introduced through the second inlet 52b in region 71 defined by members 56 and 60, and a third fluid is introduced through inlet 52c into an outer passageway 73 defined between members 53, 55, 56, and 59. In the system of FIG. 1, the first fluid is a gas mixture such as ozone/air that is delivered to the first inlet through central cavity 75. The second fluid is a liquid such as hydrogen peroxide, which coats bubbles that arise from the gas delivered to the first inlet, and the third fluid is a liquid such as water, which is injected through region 73 and acts as a shearing flow to shear bubbles off of the sidewall 56a. By adjusting the velocity of the shearing fluid, bubbles of very small size can be produced (e.g., sub-micron size). Of course adjusting the conditions and porosity characteristics of the materials can produce larger size bubbles.

Referring to FIG. 4, an alternative embodiment 50' has the cylindrical member 56 terminated along with the member 60 by a point member 78. The point member 78 can be used to directly drive the multi-fluid diffuser into the ground, with or without a well. The point member can be part of the cap 59 or a separate member as illustrated.

The multi-fluid diffuser 50 or 50' is filled with a microporous material in the space between members 56 and 60. The materials can be any porous materials such as microbeads with mesh sizes from 20 to 200 mesh or sand pack or porous hydrophilic plastic to allow introducing the second fluid into the space between the members 56 and 60.

In operation, the multi-fluid diffuser 50 is disposed in a wet soil or an aquifer. The multi-fluid diffuser 50 receives three fluid streams. In one embodiment, the first stream that is fed to the inlet 52a is a liquid such as water, whereas second and third streams that feed inlets 52b and 52c are hydrogen peroxide and a gas stream of air/ozone. The multi-fluid diffuser 50 has water in its interior, occasioned by its introduction into the aquifer. The air ozone gas stream enters the multi-fluid diffuser 50 and diffuses through the cylindrical member 56 as trapped microbubbles into the space occupied by the microporous materials where a liquid, e.g., hydrogen peroxide is introduced to coat the microbubbles. The liquid stream through the microporous materials is under a siphon condition occasioned by the introduction of water through the periphery of the multi-fluid diffuser 50. The flow of water in additional to producing a siphoning effect on the liquid introduced through inlet 52b also has a shearing effect to shear bubbles from the microporous sides of the cylindrical member 60, preventing coalescing and bunching of the bubbles around micropores of the cylindrical member 60. The shearing water flow carries the microbubbles away through the well screen disposed at the bottom of the multi-fluid diffuser 50.

Figure 5A:
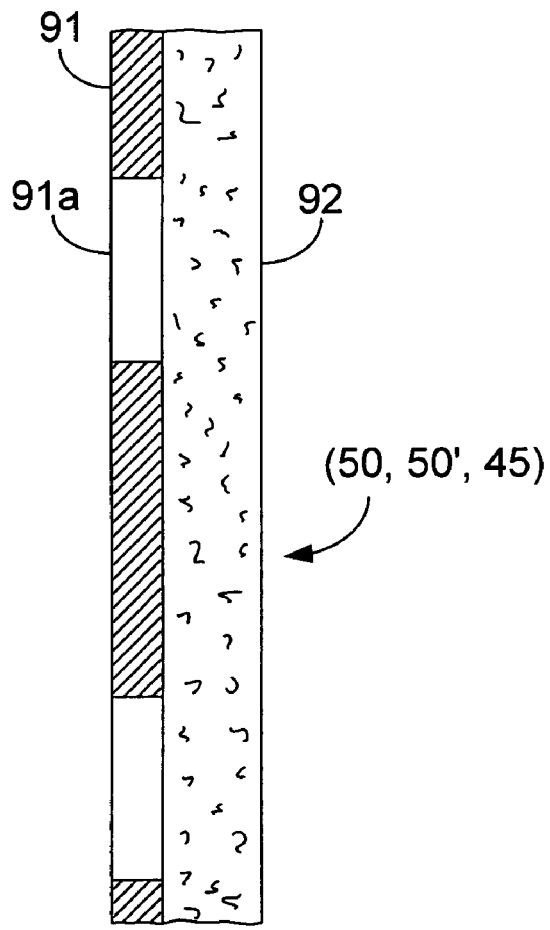
FIGS. 5A and 5B are cross-sectional view of sidewalls of the multi-fluid diffuser of FIG. 3 or 4 showing exemplary construction details.
Figure 5B:
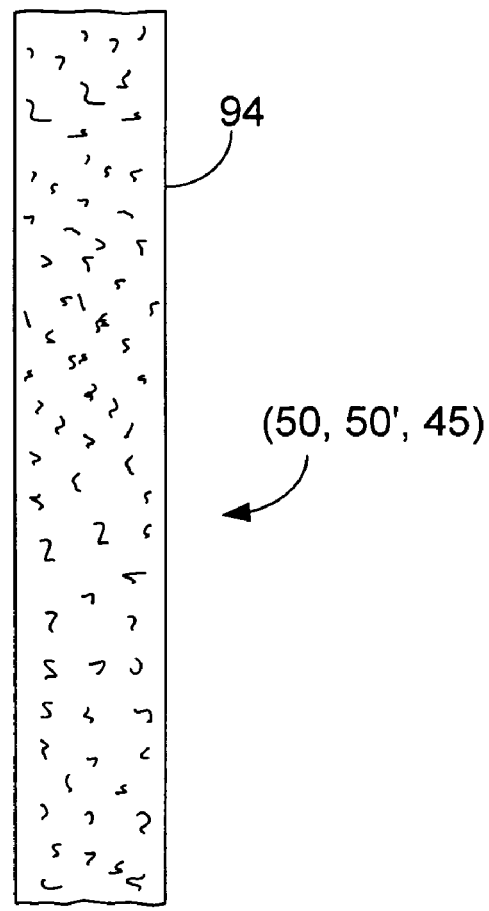

Referring now to FIGS. 5A, 5B, exemplary construction details for the elongated cylindrical members of the multi-fluid diffusers 50 or 50' and the laminar microporous diffuser 45 are shown. As shown in FIG. 5A, sidewalls of the members can be constructed from a metal or a plastic support layer 91 having large (as shown) or fine perforations 91a over which is disposed a layer of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and ABS. The support layer 91 can have fine or coarse openings and can be of other types of materials.

FIG. 5B shows an alternative arrangement 94 in which sidewalls of the members are formed of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and alkylbenzylsulfonate (ABS). Flexible materials are desireable if the laminar microporous diffuser 45 is used in an arrangement as in FIG. 2.

The fittings (i.e., the inlets in FIG. 2,) can be threaded and/or are attached to the inlet cap members by epoxy, heat fusion, solvent or welding with heat treatment to remove volatile solvents or other approaches. Standard threading can be used for example NPT (national pipe thread) or box thread e.g., (F480). The fittings thus are securely attached to the multi-fluid diffuser 50s in a manner that insures that the multi-fluid diffuser 50s can handle pressures that are encountered with injecting of the air/ozone.

A number of embodiments of the invention have been described. Nevertheless, it will be understood that various modifications may be made without departing from the spirit and scope of the invention.

What is claimed is:

1. A diffuser comprising:
   a first elongated member having a sidewall, a first portion along the length of the sidewall having solid sidewalls and a second portion along the length of the sidewall having well-screen sized openings, with the first elongated member defining an interior portion of the diffuser;
   a second elongated member having a second sidewall having a plurality of micron size openings, the second member disposed through the interior portion of the diffuser;
   a third elongated member having a third sidewall having a plurality of microscopic openings, said third member being disposed coaxial with the first and second members;
   with a first end of the second and third elongated members being sealed; and
   an inlet arrangement disposed at a second end of the diffuser for supporting a first inlet fitting to provide an ingress to a peripheral interior portion of the diffuser adjacent the first member, a second fitting to couple to an interior region between the second and third members, and a third fitting to couple to an interior region provided by the third member.

2. The diffuser of claim 1 wherein the chamber defined between the first and second elongated members is filled with a microporous material.

3. The diffuser of claim 1 wherein the microporous material is glass beads with mesh sizes from 20 to 200 mesh, sand pack or porous hydrophilic plastic.

4. The diffuser of claim 3 wherein a catalyst, containing iron, is disposed in the glass beads.

5. The diffuser of claim 1 wherein the first, second and third elongated members are cylinders, with the third cylinder disposed concentric to the second cylinder, and the second cylinder disposed concentric to the first cylinder.

6. The diffuser of claim 1 wherein the chamber defined between the first and second elongated members of the diffuser is filled with a microporous catalyst suspension material.

7. The diffuser of claim 1 wherein the inlet cap includes a first fitting disposed at a peripheral portion thereof that permits a fluid to be injected into an inner peripheral portion of the diffuser.

8. The diffuser of claim 7 wherein the inlet cap has a second fitting disposed to permit a liquid to be injected through the chamber.

9. The diffuser of claim 8 wherein the inlet cap has a third fitting disposed to permit a gas to be injected through the region defined by the third member.

10. The diffuser of claim 7 wherein the fluid injected through the first fitting is injected under conditions to cause a sheering action of bubbles that exit from sidewalls of the second member, to be carried away through the well-screen sized openings in the second sidewall portion.

11. The diffuser of claim 1 wherein second and third members have microscopic openings having a diameter in a range of 0.1 to 200 microns.

12. A method comprises:
delivering a first fluid stream to a first port of a diffuser;
delivering a gas stream to a second port of the diffuser and a liquid to a third port of the diffuser to effect production of microbubbles entrapping the gas and coated with the liquid, the coated microbubbles diffusing towards peripheral portions of the diffuser and being sheared away from those peripheral portions by the first fluid stream.

13. The method of claim 12 wherein the diffuser comprises
a first elongated member having a sidewall with a first portion of the length of the sidewall being microporous, and a second portion of the length of the sidewall having well screen sized openings with the first elongated member defining an interior hollow portion of the diffuser;
a second elongated member having a second sidewall having a plurality of microscopic openings, said second member being disposed through the hollow region of said first member;
a third elongated member having a third sidewall having a plurality of microscopic openings, said third member being disposed coaxial with the first and second members;
an end cap to seal a first end of the microporous diffuser.

14. The method of claim 13 further comprising disposing the diffuser in a well.

15. The method of claim 13 wherein the diffuser emits microbubbles having a size in a range of 0.1 to 200 microns according to a porosity characteristic of the diffuser.

16. The method of claim 12 wherein the gas is ozone.

17. The method of claim 12 wherein the gas is ozone and air.

18. Apparatus comprises:
a first pump to deliver a first stream of gas;
a second pump to deliver a second stream of gas;
a multi-fluid diffuser disposed in the well, the multi-fluid microporous diffuser, comprising:
first, second, and third inlet ports to allow entry of first second and third fluids to the multi-fluid diffuser,
a first elongated member having a sidewall with a first portion of the length of the sidewall being solid, and a second portion of the length of the sidewall having well screen sized openings with the first elongated member defining an interior hollow portion of the diffuser;
a second elongated member having a second sidewall having a plurality of microscopic openings, said second member being disposed through the hollow region of said first member;
a third elongated member having a third sidewall having a plurality of microscopic openings, said third member being disposed coaxial with the first and second members; and
an end cap to seal a first end of the microporous diffuser.

19. The apparatus of claim 18 further comprising:
an ozone generator coupled to the third port to deliver ozone to an interior defined by the third elongated member, and wherein the first gas is ozone and the second gas is air.

20. The apparatus of claim 18 wherein the end cap is a first end cap and seals first ends of the second and third member of the microporous diffuser, and the microporous diffuser further comprises a second end cap to seal an end of the first member that is proximate to the well screen.

21. The apparatus of claim 18 wherein the third member terminates in a region opposite where the first member transitions from solid sidewalls to well screen size openings.

22. The apparatus of claim 18 wherein the second member is comprised of a hydrophobic material.

23. The apparatus of claim 18 wherein regions defined by the first and second members are accessed by the first and second inlet ports.

24. The apparatus of claim 18 wherein each of the members is cylindrical in shape.

25. The apparatus of claim 18 wherein microbubbles escape through the well screen portion of the multi-fluid diffuser.

26. The apparatus of claim 18 further comprising a member coupled to interior portions of the second elongated member to isolate the end of the third member and interior region defined by the second member from the portion of the first member that has well screen size openings.

27. Apparatus comprises:
a first pump to deliver a first fluid;
a second pump to deliver a second fluid;
a third pump to deliver a third fluid
a multi-fluid diffuser disposed in the well, the multi-fluid microporous diffuser, comprising:
a top cap;
first, second, and third inlet ports to allow entry of the first, second, and third fluids to the multi-fluid diffuser,
a first elongated member having a sidewall with a first portion of the length of the sidewall being solid, and a second portion of the length of the sidewall having well screen sized openings with the first elongated member defining an interior hollow portion of the diffuser;
a second elongated member having a second sidewall having a plurality of microscopic openings, said second member being disposed through the hollow region of said first member;
a third elongated member having a third sidewall having a plurality of microscopic openings, said third member being disposed coaxial with the first and second members; and
an end cap to seal a first end of the microporous diffuser.

28. The apparatus of claim 27 further comprising an ozone generator coupled to the third inlet and a pump arrangement to supply ozone and air through the third inlet.

29. The apparatus of claim 27 wherein the diffuser emits microbubbles having a size in a range of 0.1 to 200 microns.

30. The apparatus of claim 27 wherein an air ozone gas stream enters the multi-fluid diffuser and diffuses through the multi-fluid diffuser trapped in microbubbles into space occupied by the microporous materials in which a liquid peroxide is introduced to coat the microbubbles.

31. The apparatus of claim 27 wherein the multi-fluid diffuser has water in its interior, and an air ozone gas stream enters the multi-fluid diffuser and diffuses through the multi-fluid diffuser trapped in microbubbles into a space occupied by the microporous materials where a liquid peroxide is introduced to coat the microbubbles, and water introduced through the periphery of the multi-fluid diffuser has a shearing effect to shear microbubbles from the microporous sides of the second cylindrical member, preventing coalescing and bunching of the microbubbles around micropores of the second cylindrical member.

* * * * *